W. H. RHODES.
TREE AND POST HOLE DIGGER.
No. 192,282. Patented June 19, 1877.
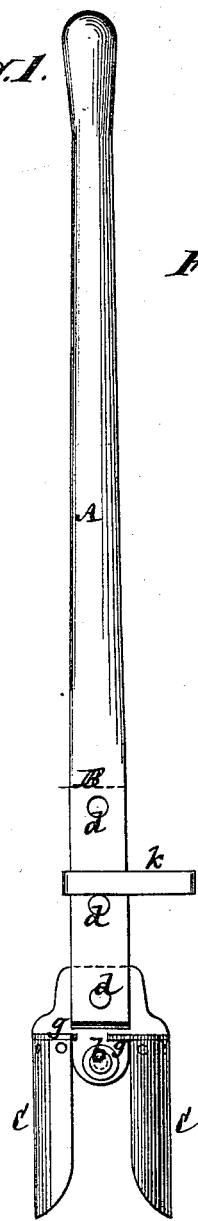
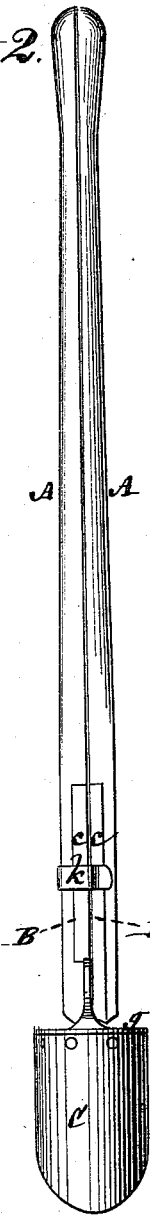
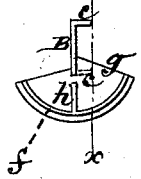
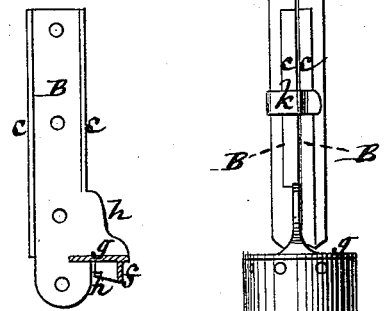
Witnesses
John Becker
Fred. Haynes
Inventor
William H. Rhodes
by his Attorneys
Brown & Allen
N. PETERS, PHOTO-LITHOGRAPHER, WASHINGTON, D.C.

UNITED STATES PATENT OFFICE.

WILLIAM H. RHODES, OF ELYRIA, OHIO.

IMPROVEMENT IN TREE AND POST HOLE DIGGERS.

Specification forming part of Letters Patent No. 192,282, dated June 19, 1877; application filed October 25, 1876.

*To all whom it may concern:*

Be it known that I, WILLIAM H. RHODES, of Elyria, in the county of Lorain and State of Ohio, have invented a new and useful Improvement in Tree and Post Hole Diggers; and I do hereby declare that the following is a full, clear, and exact description of the same, reference being had to the accompanying drawing, which forms part of this specification.

This invention relates to hole-diggers in the earth or ground for the reception of trees or posts, in which the handle of the digger is made in halves jointed together at their lower ends, so as to open and close, and provided at said ends with blades, which, when the half-handles, forming levers, are closed, are projected into the ground, and, by afterward spreading or opening the half-handles, are made to compress the earth in between them, and so provide for the removal of the earth on withdrawing the instrument from the ground.

The invention consists in a malleable cast-iron or metal foot-piece of peculiar construction for attachment of the lower end of either half-handle or lever, and for attachment of the blade thereto; also for pivoting or jointing the half-handles together after the manner of a pair of shears, whereby great strength is combined with simplicity and cheapness of construction.

Figures 1 and 2 are longitudinal views, in planes at right angles with each other, of a hole-digger for trees and posts, constructed in accordance with my invention, and showing the tool as ready for projection into the ground. Fig. 3 is an inverted view of either one of the metal foot-pieces hereinbefore referred to, and Fig. 4 a longitudinal section of the same on the line *x x* of Fig. 3. Fig. 5 is a view in perspective of one of the blades detached.

A A are the half-handles or levers, which may be made of wood, and which, when closed together, as shown in the drawing, form an entire handle. The lower ends of these half-handles or levers are attached to each other by malleable cast-iron foot-pieces B B, pivoted together at *b* to give a shears-like action. These metal foot-pieces are each formed with turned-over edges or flanges *c c*, to receive down within them as half-sockets the half-handles A A, to which they are united by rivets *d*, said foot-pieces being applied to the inner surfaces of the half-handles, and being extended down below the latter for reception or passage through them of the pivot *b*, on which the half-handles, through their attached foot-pieces, turn or work. Said malleable cast-iron foot-pieces are, moreover, made with a curved curb, *f*, corresponding in shape with the upper end of either blade C in its transverse section, and united by a top or flange, *g*, with the sides of the foot-piece at its outer edge. These curbs *f* are arranged to receive over them the upper ends of the curved blades C of the hole-digger, and said blades are secured to the curbs by rivets or otherwise.

In working the tool, however, which is dropped or projected into the soil with its half-handles closed and its blades open, as shown in the drawing, and its half-handles afterward opened and blades partly closed to compress the earth when it is required to remove the soil, a very considerable amount of strain is thrown upon the blades at their junction with the curbs *f*. To counteract this, and to give a steady support to the blades C, the tops or flanges *g* are not only made to overhang the curbs *f* (see Fig. 4) for the upper ends of the blades C to bear or butt up against, but said curbs are stiffened or strengthened by one or more braces, *h*, applied to the top or flange *g*, and formed of one piece with the remainder of the foot-piece.

A guard, *k*, to restrict the limit of separation of the half-handles A A, and a ratchet to hold the half-handles when closed, may be used, if desired.

I claim—

The metal foot-pieces B, to which the half-handles A A are attached, and by which they are pivoted or jointed at *b*, constructed with curbs *f*, to which the blades C C are attached, said curbs being mounted by an overhanging top or flange, *g*, all combined substantially as specified.

WILLIAM HENRY RHODES.

Witnesses:
J. H. McCALL,
T. S. BUNCE.